June 27, 1967    F. L. PFLASTERER    3,328,671
CONVERTIBLE WELDING GENERATOR
Filed April 6, 1964    3 Sheets-Sheet 1
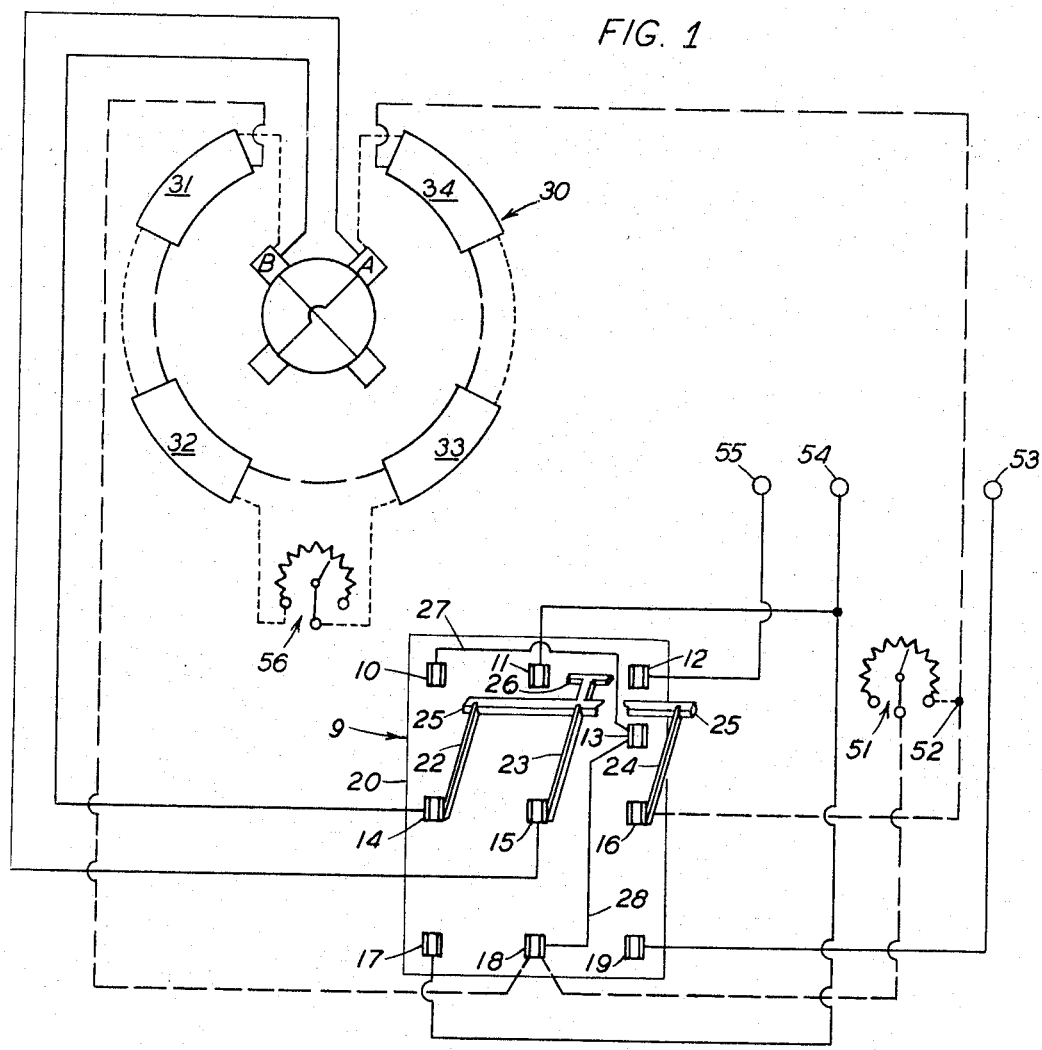
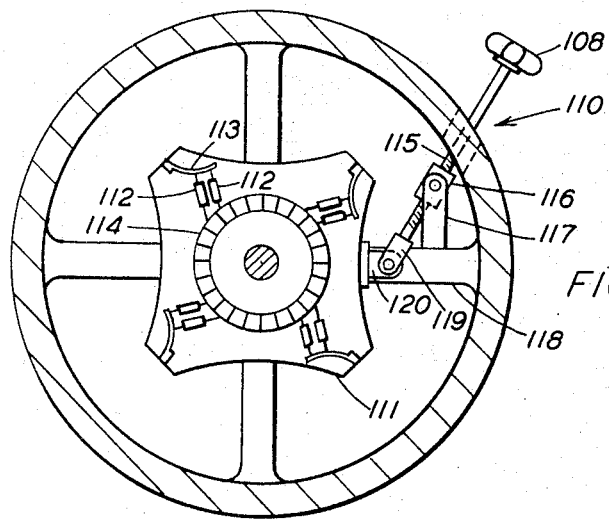
INVENTOR.
FORREST L. PFLASTERER
BY George R Nimmer
attorney June 27, 1967  F. L. PFLASTERER  3,328,671
CONVERTIBLE WELDING GENERATOR
Filed April 6, 1964  3 Sheets-Sheet 2

INVENTOR.
FORREST L. PFLASTERER
BY George R Nimmer
Attorney

June 27, 1967  F. L. PFLASTERER  3,328,671
CONVERTIBLE WELDING GENERATOR

Filed April 6, 1964  3 Sheets-Sheet 3

INVENTOR.
FORREST L. PFLASTERER
BY George R Nimmer
attorney

United States Patent Office 3,328,671
Patented June 27, 1967

3,328,671
CONVERTIBLE WELDING GENERATOR
Forrest L. Pflasterer, Omaha, Nebr., assignor to Mercury Incorporated, Omaha, Nebr., a corporation of Nebraska
Filed Apr. 6, 1964, Ser. No. 357,502
2 Claims. (Cl. 322—63)

This invention relates to direct current generators. In particular, this invention relates to a switch mechanism that causes a reversal in the magnetic flux characteristics of the generator poles so as to render a single generator suitable for various welding processes.

Direct current electricity is necessarily employed as the power source for those welding processes wherein it is desired that electrical current pass uni-directionally between the consumable welding electrode and the work piece, i.e., piece to be welded. The direct current electricity is commonly supplied either at "constant amperage" or at "constant voltage" by means of a direct current generator.

For the traditional "stick" welding process wherein a short length consumable welding electrode is manually-fed to the work piece, it is desirable that the power supply be of constant amperage. The voltage necessary to fuse the stick-like consumable electrode is manually controlled by the welding technician, i.e., welder, according to the spacing between the electrode and the work piece. Constant amperage current for the manually-fed stick process is commonly supplied by means of a direct current generator of the differential-compound type, i.e., the magnetic flux generated by the primary generator poles series and shunt windings oppose each other. By series windings is meant windings of an electrical conductor about the generator poles, these windings being connected in series between a generator brush and a terminal of an exterior load; thus, the amount of current carried in the series windings is influenced by the external load characteristics of the generator. Shunt windings are of a similar physical nature except that the current supplied to this set of windings is practically independent of the external load characteristics. Current is supplied to shunt windings either from a wholly external power source in the case of separately excited generators, or as is the case in self-excited generators, the shunt windings are connected directly between opposite potential brushes of the same generator.

For the more recently introduced welding process wherein a consumable electrode of indefinite length is automatically and continuously-fed at constant rate to the work piece under an inert gas atmosphere, it is necessary that the power supply be of constant voltage and of high, though of permissibly variable, amperage. Constant voltage current for this continuously-fed automatic process is commonly supplied by means of a direct current generator of the cumulative-compound type, i.e., the magnetic flux generated by the primary generator poles series and shunt windings reinforce and aid each other.

So as to insure quality weld characteristics, it is necessary, in both the manually-fed stick welding process and particularly in the continuously-fed automatic welding process, to modulate the voltage amplitude supplied by the direct current generator with appropriate "choke" devices. These choke devices include inductors, capacitors and slope control, "slope" meaning the voltage/amperage ratio deliver.

There are certain operational advantages for both the manually-fed stick process and for the continuously-fed automatic process, the former having greater versatility and the latter having greater efficiency for repetitive operations. At most welding installations it is desirable to have both processes available. Heretofore, it has been common, especially at mobile and outdoor installations, to have available as the power supply sources two separate direct current generators, one of constant amperage output and the other of constant voltage output at high, though variable, amperage. The common use of two separate direct current generators at such dual-process welding installations has about doubled the capital investment for electrical current generating equipment. At many indoor installations there is created thereby a space problem, it being oftentimes impractical to house both power generators within the space allowed to the welding installation. For outdoor and mobile welding installation, it is troublesome to transport two power generators about the terrain.

It is accordingly an object of the present invention to provide a direct current generator that will generate electrical current at either constant amperage or at constant voltage.

It is another object of the present invention to provide a direct current generator that will deliver variably modulated current either at constant amperage or at constant voltage, whichever is appropriate to the welding process being used.

It is yet another object of the present invention to efficiently provide for welding processes a wide range of current modulation with a limited number of properly arranged simple choke devices, including a novel slope control mechanism.

It is yet another object of the present invention to quickly, simply, and reversibly convert any conventional differential-compound direct current generator to a cumulative-compound direct current generator, the same generator pole and armature windings being employed in both cases.

These and other objects and advantages are accomplished by means of a double-throw switch tied into the circuitry of a direct current generator whereby the current direction may be instantaneously reversed at will in the generator poles series windings. For welding processes, the direct current generated is appropriately modulated by means of properly arranged simple choke devices, including a novel slope control mechanism comprising a revolvable generator brush-holder ring.

In the drawing:

FIGURE 1 shows the electrical circuitry of a classic direct current compound generator, the generator being readily and reversibly convertible from differential to cumulative-compound and vice versa by means of a double-throw switch that causes a reversal in the current flow in the generator poles series windings.

FIGURE 2 together with auxiliary FIGURE 2A shows the electrical circuitry of a separately excited direct current compound generator, the generator being similarly convertible as in FIGURE 1, the generator being provided with novel auxiliary choke apparatuses appropriate to a versatile power supply for various welding processes.

FIGURE 4 is an end view of a novel slope control choke device taken along line 4—4 of FIGURE 3.

Figures 2, 2A:
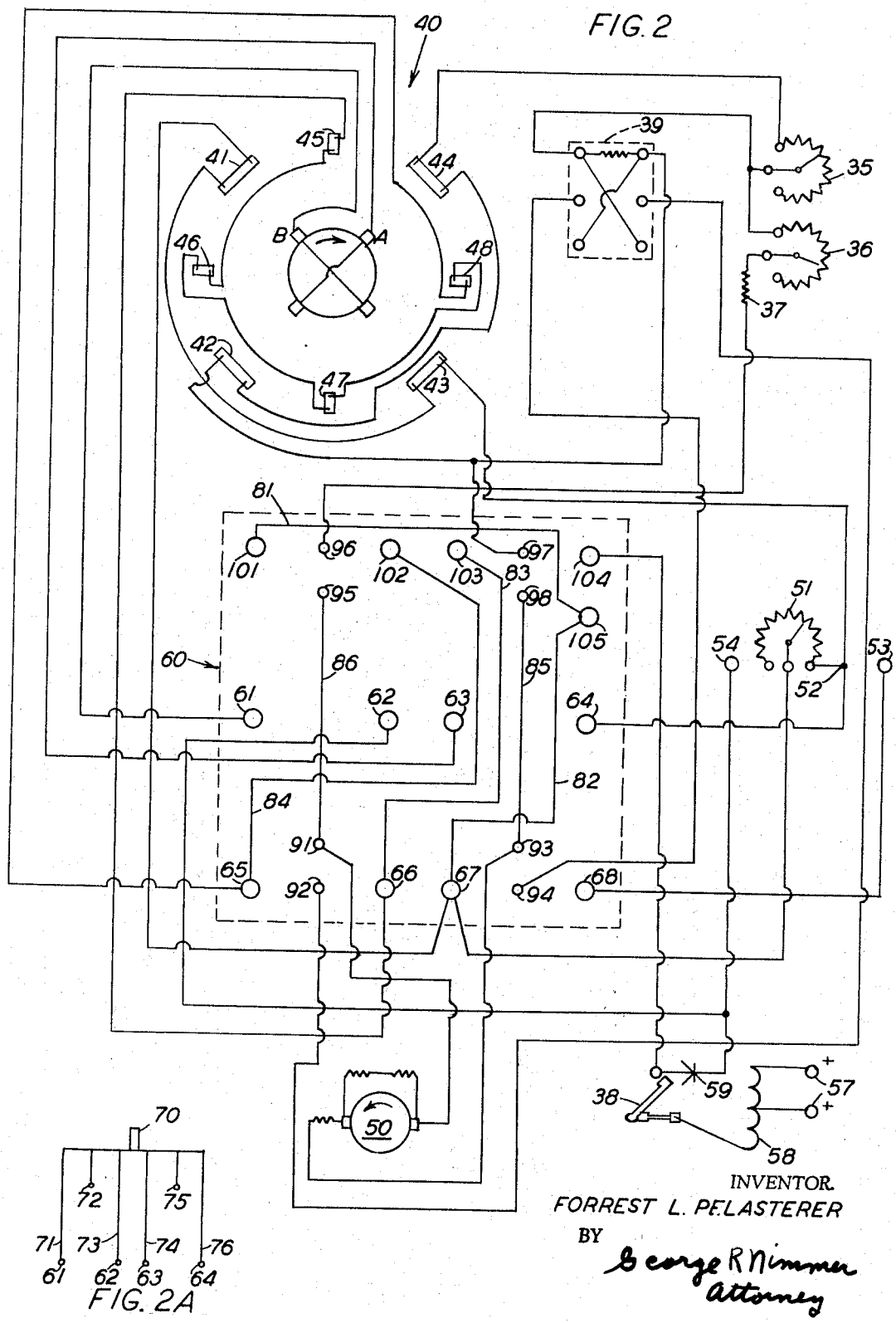

In FIGURE 1, it can be seen that the double-throw knife switch 9 comprises ten clevis-type electrodes, numbered from 10 through 19 inclusively, mounted on the front face of a baseboard 20, each of the ten electrodes passing through baseboard 20 and protruding through the back side thereof. Three electrically-conductive knife blades 22, 23, and 24 are pivotably fastened into the clevis of electrodes 14, 15, and 16 respectively. Cross bar 25, which securely connects knife blades 22, 23, and 24 together, is made of an electrically insulative material. Cross bar 25 is integrally provided with handle 26. Double-throw knife switch 9 is provided with electrically-conductive jumper cables 27 and 28 which connect the back side protrusions of electrode 10 with 13, and 13 with 18, respectively.

Self-excited compound direct current generator 30 comprises generator poles 31, 32, 33, and 34. Each of said generator poles is provided with series windings, indicated in dashed lines, and with shunt windings connected directly across brushes A and B, the shunt windings being indicated in dotted lines. Rheostat 56 governs the current in the shunt windings.

When the knife blades 22, 23, and 24 of the double-throw knife switch 9 are in the "downward" closed position, the electrical current potential from negative potential brushes A of generator 30 travels to electrode 15 and thence along knife blade 23 to electrode 18. At electrode 18, the current potential divides into two paths, both paths being indicated by dashed lines. The first path proceeds as windings in series about generator poles 31, 32, 33, and 34 in order, each of said four windings being so directionally disposed about the generator poles so that the flux produced thereby is in opposition to the flux established by the shunt windings. The second path from electrode 18 proceeds to current regulatory reactor 51, which regulates the amount of current supplied to the generator poles series windings via the first path. The current from both paths rejoins at juncture 52 and proceeds to electrode 16, thence along knife blade 24 to electrode 19 and finally to terminal 53 of an exterior load, said terminal being negative. The electrical current potential from positive potential brushes B of generator 30 travels to electrode 14, thence along knife blade 22 to electrode 17, and finally to terminal 54 of an exterior load, said terminal being positive.

When the knife blades 22, 23, and 24 of the double-throw knife switch 9 are in the "upward" closed position, the electrical current potential from negative potential brushes A travels to electrode 15, thence along knife blade 23 to electrode 11 and finally to terminal 54, said terminal being negative. The electrical current potential from positive potential brushes B travels to electrode 14, thence along knife blade 22 to electrode 10, and thence by jumper cable 27 to electrode 13. At electrode 13, the current potential divides into two paths. One path travels along knife blade 24 to electrode 16 and thence as windings in series about generator poles 34, 33, 32, and 31 in order, and back to electrode 16 via electrode 18 and jumper cable 28. This first path is in shunt across the second path which travels from electrode 13 via knife blade 24 to electrode 12, and thence to terminal 55, said terminal being positive.

FIGURE 1 thus demonstrates, in the case of a classic self-excited direct current compound generator, a reversal in current direction through a single existing set of generator poles series windings by means of double-throw knife switch 9. This reversal in current direction changes the compounding characteristics of the generator from differential to cumulative as the pivotal knife 21 is changed from the "downward" closed position to the "upward" closed position. In the "downward" closed position, the flux produced by the series and shunt windings on each pole oppose each other and the generator is by definition differential-compound. As a result of the change of current direction through the generator poles series windings when the pivotal knife 21 is in the "upward" closed position, the flux produced by the series and shunt windings aid each other and the generator becomes one of the cumulative-compound type.

Figure 3:
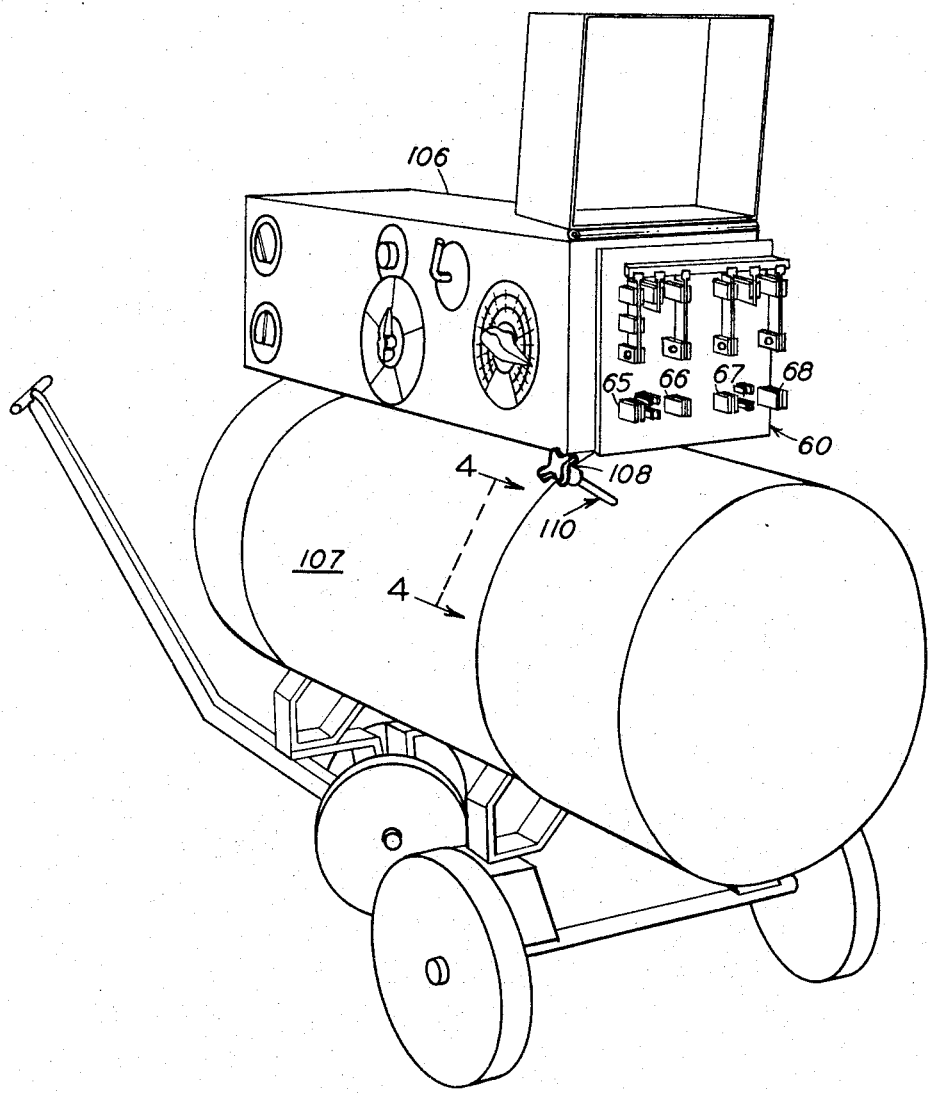
FIGURE 3 is a perspective representation of the versatile power supply of FIGURE 2 shown in a form that might be used for various welding processes.

In FIGURE 2, a direct current compound generator 40 having a double-throw switch 60 tied into its circuitry is shown along with novel auxiliary choke devices so as to provide a single piece of apparatus that is suitable for both manual-feed and automatic continuous-feed welding processes. FIGURE 3 shows a pictorial representation of the assembled apparatus.

Generator 40 is separately excited by exciter 50 in counter-distinction with generator 30, which is self-excited. Further, generator 40 is additionally equipped with flux-producing interpoles 45, 46, 47, and 48 spaced between primary generator poles 41, 42, 43, and 44. Primary generator poles 41 and 43 are provided with shunt-type windings from the exciter 50 whereas primary poles 42 and 44 are provided with windings in series between the exterior load and generator brushes of a given electrical potential.

Double-throw switch 60 is of similar construction to double-throw switch 9 with the exception that there are twenty-one clevis-type electrodes instead of ten. Further, as is shown in auxiliary FIGURE 2A so as to avoid crowding in FIGURE 2, there are six knife blades 71, 72, 73, 74, 75, and 76, four of which, 71, 73, 74, and 76, are pivotably connected to four central electrodes 61, 62, 63, and 64, respectively. Additionally, the back side of switch baseboard 20 is equipped with six jumper cables 81, 82, 83, 84, 85, and 86, that connect various electrodes together which will be explained in greater detail in the following paragraphs.

When the knife blades 71, 72, 73, 74, 75, and 76 of double-throw knife switch 60 are in the "downward" closed position, the electrical current potential from negative potential brushes A of generator 40 travels to electrode 63, thence along knife blade 74 to electrode 67 where the current divides into two paths. The first path proceeds as windings in series about generator poles 41 and 43 in order, each of said two windings being so directionally disposed about the two generator poles so that the current as indicated makes both poles "North." The second path from electrode 67 proceeds to current regulating reactor 51, which regulates the amount of current fed to the poles series windings via the first path. The current from both paths rejoins at juncture 52 and proceeds to electrode 64, thence along knife blade 76 to electrode 68, and finally to terminal 53 of an exterior load, said electrode being negative.

The electrical current potential from positive potential brushes B of generator 40 travels to electrode 61, thence along knife blade 71 to electrode 65. From electrode 65 the current proceeds as four windings in series about interpoles 48, 47, 46, and 45 in order, each of said four windings being so directionally disposed about the respective interpoles whereby interpoles 48 and 46 are "South" and interpoles 47 and 45 are "North." From interpole 45, the current proceeds to electrode 66, thence via knife blade 73 to electrode 62, and finally to terminal 54, said terminal being positive.

Exciter 50 which is an independent direct current generator, yet which is driven by the same motor that drives generator 40, provides current for the shunt-type windings about primary generator poles 42 and 44. The shunt-type windings about poles 42 and 44 are so directionally wound whereby both poles are rendered of like polarity when current is traveling therethrough. The current proceeds from one brush of exciter 50 to electrode 91, thence via knife blade 72 to electrode 92, and thence to a double-throw current reversing switch 39. From the opposite polarity brush of exciter 50, the current proceeds to electrode 93, thence via knife blade 75 to electrode 94, and thence to current reversing switch 39. Rheostat 35 governs the amount of current supplied from switch 39 to the shunt wound poles 42 and 44. The double-throw current reversing switch 39 is actuated into that position which will make generator poles 42 and 44 "North."

The separately excited direct current compound generator thus far described under FIGURE 2, is by definition differential-compound because the flux produced by the shunt windings on "North" primary generator poles 42 and 44 oppose the flux produced by the series windings on "North" primary generator poles 41 and 43. That all four primary poles are of like "North" polarity is not unusual for direct current generators used in the welding industry. The Lincoln Electric Company of Cleveland, Ohio, produces a unipolarity generator for electric arc "stick" welding exclusively under the tradename "Lincoln SAE," wherein all primary poles are "North" and wherein the interspersed interpoles are alternately "North" and "South." This type differential-compound direct current generator produces constant amperage current which is admirably well-suited for the manual-feed stick welding process. In this type welding the negative terminal 53 is connected to the manually-fed consumable electrode whereas the positive terminal 54 is connected to the piece to be welded.

By means of the double-throw switch 60 tied into the generator circuitry in this novel manner, together with the properly selected and disposed current modulating choke devices, the just described differential-compound direct current generator 40 becomes additionally reversibly convertible into a constant-voltage and high amperage power supply which is operable as a power supply for automatic and continuously-fed welding processes. When the knife blades 71, 72, 73, 74, 75, and 76 of double-throw knife switch 60 are in the "upward" closed position, there is a reversal in current flow through the series windings about primary generator poles 41 and 43 with the result that these two poles become "South." Since the flux produced by these two series windings reinforce and aid the flux produced by the shunt windings about primary generator poles 42 and 44, the resultant generator is by definition cumulative-compound and produces constant potential current which is suitable for the automatic continuously-fed welding process.

Electrical current potential from negative potential brushes A of generator 40 travels to electrode 63, thence along knife blade 74 to electrode 103, thence by jumper cable 83 to electrode 66, and thence to interpoles 45, 46, 47, and 48, in order. Because of this reversed order of current flow, interpoles 47 and 45 are changed to become "South," while interpoles 46 and 48 are reversed to become "North." From "North" interpole 48, the current proceeds to electrode 65, thence by jumper cable 84 to electrode 102, thence by knife blade 73 to electrode 62 and finally to terminal 54, said terminal being negative.

Electrical current potential from positive polarity brushes B of generator 40 travels to electrode 61, thence along knife blade 71 to electrode 101, thence along jumper cable 81 to electrode 105. At electrode 105 the current potential divides into two paths. One path travels along knife blade 76 to electrode 64 and thence as series windings about generator poles 43 and 41, in order. Because of this reversed order of current flow, poles 43 and 41 become "South." From "South" pole 41, this first path proceeds back to electrode 67 to electrode 105 via jumper cable 82 so as to be a shunt path with the second path. The second path leads from electrode 105 via knife blade 76 to electrode 104 and thence via switch 38 and inductor 58 to a positive terminal as a continuously-fed consumable welding electrode 57. A polarized capacitor 59 is placed between negative terminal 54 and positive terminal 57. Choke devices are the inductor 58, the polarized capacitor 59, and a hereafter described slope control device 110. These choke devices arranged as described, modulate the amplitude of the voltage supplied appropriate to the automatic continuous-feed welding process.

Current proceeds from one brush of exciter 50 to electrode 91, thence via jumper cable 86, electrode 95, and knife blade 72 to electrode 96. From electrode 96 the current proceeds in order via variable resistance 37 and rheostats 36 and 35 to the shunt wound generator poles 44 and 42 in order, the shunt windings being so directionally disposed about the poles so that the flux produced by current traveling in this direction makes these two poles "North." The current proceeds from generator pole 42 back to electrode 97, thence via knife blade 75, electrode 98, jumper cable 85 and electrode 93 back to exciter 50.

FIGURE 3, a pictorial representation of the versatile power supply source described under FIGURE 2, shows the double-throw switch 60 mounted at the end of a box-like structure 106 which houses many of the indicator apparatuses along with the inductor 58 and polarized capacitor 59 choke devices, electrical terminals, and other apparatus auxiliary to the generator including rheostats 35 and 36, variable resistance 37, reactor 51, and current reversing switch 55. The generator 40 is located beneath the box-like structure 106 within cylindrical housing 107. Control knob 108 for the slope control device 110 is shown protruding from housing 107. As previously mentioned the power supply source provides in a single apparatus constant-amperage current for manually-fed stick welding and constant-voltage current for automatic continuously-fed welding. Of course, these currents furnished can be used for other applications. For example, the apparatus can be used on air fields to provide a constant amperage power source for manual-feed stick welding; additionally, it can be used in the constant potential form for starting aircraft engines, a constant potential power source being appropriate to safeguard certain sensitive electrical equipment in the aircraft.

FIGURE 4 is an end view of a novel welding apparatus slope control choke device taken along line 4—4 of FIGURE 3. As previously mentioned, slope control is defined as the voltage/amperage ratio delivered by a power source, this ratio makes possible a choice of different arc characteristics to match different types of welding conditions.

The slope control device 110 operates upon the principle of providing angular motion to a brush-holder ring 111 so as to move the brushes 112 and their associated brush-holders 113 circumferentially about the revolvable commutator 114. This circumferential rotation is provided by means of threaded shaft 115 having a control knob 108, said shaft being in threaded engagement with a perforate block 116, said perforation being threaded. Perforate block 116 is pivotably connected to upright 117, which is attached to internal strap 118 of generator housing 107. Fastener 119 is of split clevis-like construction at one end only, the other end being solid and provided with a threaded perforation; shaft 115 is in threaded engagement with the perforation of fastener 119. The split clevis-like end of fastener 119 pivotably engages a rod 120 which is attached to brush-holder ring 111. Thus, rotation of the control knob 108 in either direction causes circumferential rotation of the brush-holder ring 111 and its attached brush-holder 111 and brushes 112 about the revolvable commutator 114 which in turn results in slope variation according to the circumferential change initiated.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. In a separately excited direct current differential-compound generator having four flux-producing primary poles and four flux-producing interpoles, said primary poles and interpoles being positioned alternately about the generator armature, said four primary poles being of like polarity, two of said primary poles being separately-excited through shunt windings and the remaining two of said primary poles having windings connected in series between one terminal of an external load and a first generator brush having a given electrical potential, each of said interpoles having windings connected in series between a second terminal of the external load and a second generator brush having a potential opposite to said first generator brush, a capacitor being placed across the terminals of said external load, said first and second generator brushes being revolvably disposed about said armature, a double-throw knife switch being tied into the generator circuit between the external load and the interpoles series windings, between the interpoles series windings and the second generator brush, between the first generator brush and said two primary poles series windings, and between said two primary poles series windings and the external load, whereby when the double-throw knife switch is changed from the one closed position to the other, there is a reversal in current in all said series windings whereby the two primary series wound primary poles become of reverse polarity to the two shunt wound primary poles, and whereby the respective interpoles reverse their polarity, thereby resulting in a cumulative-compound generator having a constant potential and high amperage direct current output that is operable for automatic continuously-fed welding processes.

2. In a separately excited direct current differential-compound generator having a plural number of flux-producing primary poles and a like number of flux-producing interpoles, said primary poles and interpoles being positioned alternately about the generator armature, said primary poles being of like polarity, less than all of said primary poles being separately-excited through shunt windings and the remaining number of said primary poles having windings connected in series between one terminal of an external load and a first generator brush having a given electrical potential, each of said interpoles having windings connected in series between a second terminal of the external load and a second generator brush having a potential opposite to said first generator brush, a choke means being placed across the two terminals of said external load, said first and second generator brushes being revolvably disposed about said armature, a switch means being tied into the generator circuit between the external load and the interpoles series windings, between the interpoles series windings and the second generator brush, between the first generator brush and said primary poles series windings, and between said primary poles series windings and the external load, whereby when the switch means is changed from one position to another there is a reversal in electrical current flow in all said series windings whereby the series wound primary poles become of reverse polarity to the shunt wound primary poles, and whereby the respective interpoles reverse their polarity thereby resulting in a cumulative-compound generator having a constant potential and high amperage direct current output that is operable for automatic continuously-fed welding processes.

References Cited

UNITED STATES PATENTS

| | | | |
|---|---|---|---|
| 1,501,878 | 7/1924 | Burke | 219—135 X |
| 1,719,112 | 7/1929 | Holslag | 310—128 |
| 1,862,922 | 6/1932 | Churchward | 219—135 X |
| 2,180,700 | 11/1939 | Tisza et al. | 322—63 X |
| 2,197,888 | 4/1940 | Hobart | 322—62 X |
| 2,866,888 | 12/1958 | Tuthill | 322—63 X |

MILTON O. HIRSHFIELD, *Primary Examiner.*

J. J. SWARTZ, J. W. GIBBS, *Assistant Examiners.*